R. E. STECKEL.
LIGHT CONTROLLED TIMING DEVICE FOR USE IN PHOTOGRAPHY AND THE MEASUREMENT OF LIGHT INTENSITY.
APPLICATION FILED AUG. 9, 1915.

1,183,778.

Patented May 16, 1916.

WITNESSES:
Leonard Struewe
W H Tedman

INVENTOR
Roy E. Steckel
BY
Adolph E Damiga
ATTORNEY

UNITED STATES PATENT OFFICE.

ROY E. STECKEL, OF LOS ANGELES, CALIFORNIA, ASSIGNOR OF ONE-HALF TO ADOLPHE DANZIGER, OF LOS ANGELES, CALIFORNIA.

LIGHT-CONTROLLED TIMING DEVICE FOR USE IN PHOTOGRAPHY AND THE MEASUREMENT OF LIGHT INTENSITY.

1,183,778. Specification of Letters Patent. Patented May 16, 1916.

Application filed August 9, 1915. Serial No. 44,631.

*To all whom it may concern:*

Be it known that I, ROY E. STECKEL, a citizen of the United States, a resident of Los Angeles, in the county of Los Angeles and State of California, have invented a certain new and useful Improvement in Light-Controlled Timing Devices for Use in Photography and the Measurement of Light Intensity, of which the following is a full and clear description, such as will enable those skilled in the art to which it appertains to make and use the same, reference being had to the accompanying drawings, which form a part of this specification.

My invention relates to improvements in light controlled timing devices for use of photographers, and is particularly allied to that class of timing devices which are actuated by the action of light upon a dull black surface of a delicately poised vane within a vacuum chamber, coacting with a stationary tabulated index-plate to designate the exact length of exposure necessary, (in units of time, to produce a correct, clear and distinct reproduction of the object to be photographed) in relation to the degree of intensity or strength of light existing at the instant of exposure, (the time or speed of the film being known, which, (by the way,) is customarily marked upon the wrapper thereof,) and consists in certain new and novel features of construction and arrangement of parts, which are fully hereinafter described, and pointed out in the claims.

The object of this invention is to produce a device which will automatically indicate the exact length of time to expose a film of known speed or sensitiveness, in any degree of intensity or strength of light which may prevail at the instant of exposure, and which will be simple in construction, efficient in operation, not liable to derangement and that can be manufactured cheaply.

A further object is to eliminate any chance of error in judgment on the part of the operator in regard to the degree of intensity or strength of light existing at the instant of exposing the film, thereby enabling even a novice in the art, to produce a properly timed negative without any mental effort or calculation whatsoever.

Figure 1:
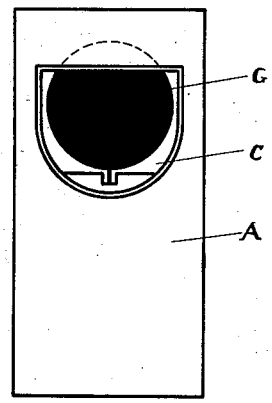
Figure 2:
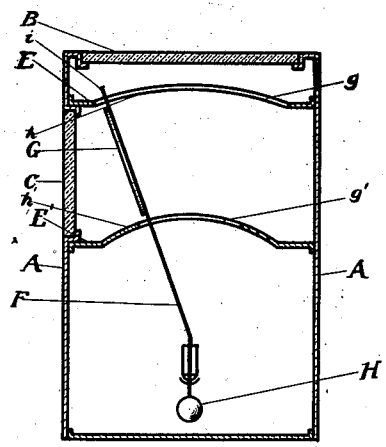
Figure 3:
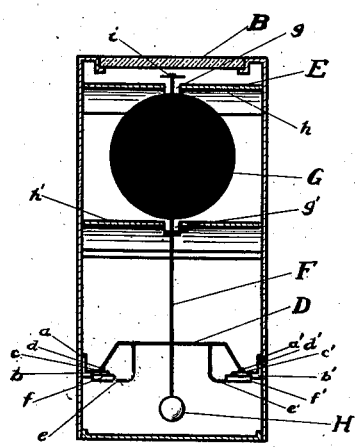
Figure 4:
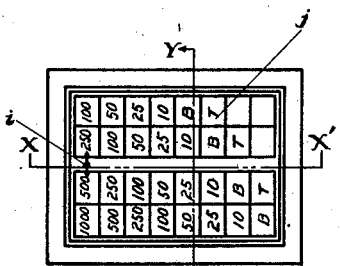
Figure 5:
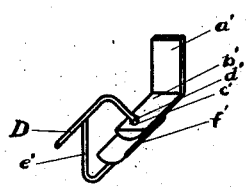

Referring to the drawings, Figure 1, is a front elevation of the device, showing the front window and the light actuated member as it appears therethrough. Fig. 2, is a view in longitudinal section taken on line X, X. Fig. 3, is a like view taken on line Y, Y. Fig. 4, is a plan view of the device, showing the slotted index-plate and the indicating pointer protruding up through the forward end of said slot. Fig. 5, is an enlarged detail of one of the pivot point bearings and its supporting bracket.

Similar characters of reference denote like parts in each of the several views.

A, is the body of the instrument, chamber-like in form, and constructed of any suitable material, (*i. e.*) either with a metal body provided with transparent windows, or entirely of glass as the requirements appear to demand.

B, is a transparent window which it fitted into an opening in the top of the chamber A, so as to lie flush with the surface thereof, and is cemented therein so as to hermetically seal said chamber.

C, is a front window of transparent material, and like-wise cemented in place so as to seal said chamber.

a, and a', are brackets formed either entirely of glass or other suitable material, and which are secured to the inner walls of the chamber, A, in any approved manner, so that the inwardly projecting lugs of each will extend in perfect alinement with the other. The location of the brackets a, and a', within the chamber A, is approximately central of the depth, and considerably below the center of the height thereof. The inwardly projecting limbs, b, and b', of the brackets a, and a', are semi-circular in cross section, and upon their upper flat surfaces, are formed the depressions c, and c', or jewels are set, as the case may require, the purpose of which will appear later on.

D, is a shaft, also in alinement with the limbs b, and b', of the brackets a, and a', and provided at each end with a depending pivot point d, and d', and the depending guard arms e, and e', respectively. Said guard arms carry the guards f, and f', which are formed to fit neatly around the lower sides of the limbs b, and b', of the brackets a, and a', and are arranged to travel closely but freely thereabout, for the purpose of preventing accidental displacement of the pivot points d, and d', from their step bearings or jewels $c$, and $c'$, in the upper surfaces of the limbs $b$, and $b'$, and about which points said guards oscillate.

Two arched partitions E, and E', each provided with a central longitudinal slot $g$ and $g'$, respectively, and having opposed mirrored surfaces $h$, and $h'$, are securely fastened in the upper portion of the chamber A, in such positions that their arcs extend concentric to the seats of the pivot points $d$, and $d'$. The forward end of the partition E, is secured just above the upper edge of the front window C, and the partition E', has its front end secured just below the lower edge of said front window, and both of said partitions are of such outside dimensions as to completely fill the chamber A, transversely.

A fragile staff F, extends upwardly and forwardly from the shaft D, and passing freely through the slots $g$, and $g'$, terminates slightly above the upper surface of the partition E, and the extreme upper end of said staff is provided with a minute bar $i$, extending across the slot $g$, for a purpose to which reference will be made later on. To the staff F, and within the space between the partitions E, and E', is affixed an extremely light weight metallic vane G, with one of its sides facing the window C, and arranged to travel closely but freely back and forth between the mirrored surfaces $h$, and $h'$, of the arched partitions E, and E', when actuated, but to remain normally in close proximity to the window C, (when light rays are excluded therefrom,) in which position it is maintained by the action of gravity upon the pendant H, which is secured to the shaft D, in such position as to act as a counterpoise for the said staff and screen.

Upon the upper surface of the partition E, and upon each side of the slot $g$, is displayed a graduated table $j$, expressed in units of time, and ranging from TIME to 1.000.

The front side of the vane G, is coated a dull black, while the opposite side thereof is a highly polished or mirrored surface.

The device is designed primarily as an attachment for photographic cameras, but it is evident that it may be utilized in conjunction therewith, without being attached thereto.

The principle involved in the construction of the device is identical with that embodied in Crooks's radiometer, (i. e.) light rays projecting upon a dull black surface of a delicately poised vane G, in a vacuum chamber A, are absorbed thereby and the surface of said vane becomes heated in consequence thereof, which in turn imparts heat to the highly rarefied residual air within said chamber, causing the molecules thereof to spring away therefrom, thereby creating space and opportunity for the bombardment of said vane by the inrushing molecular contents of said chamber from the more remote and cooler locations thereof, and as the opposite side of the vane G, is a highly polished or mirrored surface, all particles of light are repulsed therefrom by reflection, in consequence whereof, this side of the vane remains cool. As will readily be seen, the resultant action of light upon the opposite sides of the said vane, will create a difference of molecular potential or pressure within the said chamber and upon the opposite sides of said vane, thereby causing a recession of said vane from the advancing light rays, said recession or retreat being in direct proportion to the intensity or strength of light projected upon the dull black surface thereof.

For the purpose of strengthening the mechanical action of the device, curved mirrors are employed above and below the path of travel of the vane G, and are so located as to reflect and concentrate light rays upon the dull black surface thereof, thereby augmenting the molecular activity within said chamber, and consequently upon said vane.

The operation of the device is as follows: The camera being served with a film of known speed or sensitiveness, and in readiness to photograph an object, the timing device is exposed to the light, when the vane G, will recede within the chamber to a point directly proportionate to the intensity or strength of light existing at the instant of observation, and the bar $i$, will be positioned to indicate upon the index-plate $j$, the exact length of time to expose the film in the existing light, to produce a perfect negative.

Having thus described my invention what I claim and desire to secure by Letters Patent is—

1. In a device of the character described, a vacuum chamber, provided with means for admitting light to the interior thereof, a light actuated vane pivotally swung therein, and provided with means for holding said vane normally close to one of the side walls thereof, when light is excluded therefrom, and adapted to recede within said chamber and away from said side wall when light enters said chamber, a tabulated index within said chamber, and indicating means carried by said vane and coacting with said index to automatically indicate periods of time, said periods of time being relatively proportionate to the degree of intensity of light within said chamber, a mirror within said chamber and adapted to concentrate reflected light rays upon said vane, to augment the mechanical action thereof, essentially as and for the purpose set forth.

2. In a device of the character described, a vacuum chamber provided with a window for admitting light to the interior thereof, brackets extending inwardly from the side walls of said chamber, toward and in alinement with each other, a delicately counterpoised light actuated vane in said chamber and pivotally swung from said brackets, and adapted to be held normally close to said window in the absence of light therefrom, and further adapted to recede from said window and within said chamber when light enters therethrough, a plurality of curved mirrors in said chamber arranged to reflect and concentrate light rays upon said vane, for the purpose of augmenting the mechanical action thereof, an indicator bar carried by said vane and coacting with a stationary tabulated index to designate periods of time, said periods being relatively proportionate to the intensity or strength of light within the said chamber, and in contact with said vane.

In testimony whereof I have hereunto affixed my signature at Los Angeles, California, this 3rd day of August, 1915, in the presence of subscribing witnesses hereto.

ROY E. STECKEL.

Witnesses:
  W. W. JUDY,
  L. K. PARKS.